United States Patent
Nakata

(10) Patent No.: US 10,877,965 B2
(45) Date of Patent: Dec. 29, 2020

(54) DATA SEARCH METHOD, DATA SEARCH DEVICE, AND DATA SEARCH PROGRAM

(71) Applicant: NEC Corporation, Tokyo (JP)

(72) Inventor: Masanori Nakata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 271 days.

(21) Appl. No.: 15/840,105

(22) Filed: Dec. 13, 2017

(65) Prior Publication Data

US 2018/0181614 A1 Jun. 28, 2018

(30) Foreign Application Priority Data

Dec. 22, 2016 (JP) .................................. 2016-249717

(51) Int. Cl.
*G06F 16/00* (2019.01)
*G06F 16/2453* (2019.01)
*G06F 16/2455* (2019.01)

(52) U.S. Cl.
CPC ...... *G06F 16/2453* (2019.01); *G06F 16/2455* (2019.01)

(58) Field of Classification Search
CPC .......................... G06F 16/2453; G06F 16/2455
See application file for complete search history.

(56) References Cited

U.S. PATENT DOCUMENTS

| | | | | |
|---|---|---|---|---|
| 8,713,002 | B1* | 4/2014 | Sahami | G06F 16/43 707/723 |
| 10,211,978 | B2* | 2/2019 | Mattsson | H04L 9/0816 |
| 2002/0004925 | A1* | 1/2002 | Kodama | H03M 13/293 714/770 |
| 2005/0192937 | A1* | 9/2005 | Barsness | G06F 16/24542 |
| 2008/0235193 | A1 | 9/2008 | Hattori | |
| 2008/0270363 | A1* | 10/2008 | Hunt | G06F 16/2462 |
| 2009/0327669 | A1* | 12/2009 | Imada | G06F 9/3851 712/226 |
| 2010/0070448 | A1* | 3/2010 | Omoigui | H01L 27/14647 706/47 |
| 2010/0077073 | A1 | 3/2010 | Haenel et al. | |
| 2010/0098342 | A1* | 4/2010 | Davis | G06K 9/00476 382/220 |
| 2012/0136850 | A1 | 5/2012 | Barsness et al. | |

(Continued)

FOREIGN PATENT DOCUMENTS

| | | | |
|---|---|---|---|
| JP | 2006-040081 A | 2/2006 | |
| JP | 2008-234430 A | 10/2008 | |

(Continued)

OTHER PUBLICATIONS

Extended European Search Report for EP Application No. EP17209265.2 dated Feb. 8, 2018.

(Continued)

*Primary Examiner* — Noosha Arjomandi

(57) ABSTRACT

A data search device includes a prediction unit that predicts a resource amount to be used in query processing scheduled to be executed, using a relationship between query processing executed in a past and a resource amount used in the query processing, and a change unit that changes an upper limit value of a resource amount usable in query processing to the predicted resource amount to be used in the query processing scheduled to be executed for which execution has been permitted.

12 Claims, 11 Drawing Sheets

(56) References Cited

U.S. PATENT DOCUMENTS

| | | | |
|---|---|---|---|
| 2012/0215764 A1 | 8/2012 | Barsness et al. | |
| 2013/0024442 A1* | 1/2013 | Santosuosso | G06F 16/245 707/720 |
| 2016/0103838 A1* | 4/2016 | Sainani | H04L 41/5012 707/725 |
| 2016/0306965 A1* | 10/2016 | Iyer | G06Q 10/105 |
| 2017/0083572 A1* | 3/2017 | Tankersley | G06F 3/04847 |
| 2018/0024901 A1* | 1/2018 | Tankersley | G06F 16/2379 707/694 |
| 2018/0107763 A1* | 4/2018 | Chen | G06N 7/005 |

FOREIGN PATENT DOCUMENTS

| | | |
|---|---|---|
| JP | 2009-193205 A | 8/2009 |
| JP | 2012-118987 A | 6/2012 |
| JP | 2015-106219 A | 6/2015 |
| WO | 2008/038342 A1 | 4/2008 |

OTHER PUBLICATIONS

Communication dated Aug. 26, 2019, from the European Patent Office in counterpart European Application No. 17209265.2.

Anonymous, "Optimize MySQL tmp_table_size", Place of all tech articles,(https://web.archlve.org/web/20141026171432/http://www.techinfobest.com/optimysql-tmp_table_size/), Oct. 26, 2014 (3 pages total).

Summons to attend oral proceedings for EP Application No. EP17209265.2 dated on Apr. 17, 2020.

Anonymous: "SQL Server—Simple Example to Configure Resource Governor—Introduction to Resource Governor SQL Server Journey with SQL Authority", Jun. 15, 2012 (Jun. 15, 2012), XP055683787, Retrieved from the Internet: URL:https://web.archive.org/web/20120615193906/https://blog. sqlauthority.com/2012/06/04/sql-server-simple-example-to-configure-resource-governor-introduction-to-resource-governor/ [retrieved on Apr. 7, 2020].

Japanese Office Action for JP Application No. 2016-249717 dated Oct. 13, 2020 with English Translation.

Result of consultation for EP Application No. EP17209265.2 date on Oct. 20, 2020.

Anonymous: "Graphic processing unit" Wikipedia, (https://en.wikipedia.org/w/index.php?title=Graphics_Processing_unit&oldid=747318138), retrieved on Oct. 19, 2020.

\* cited by examiner

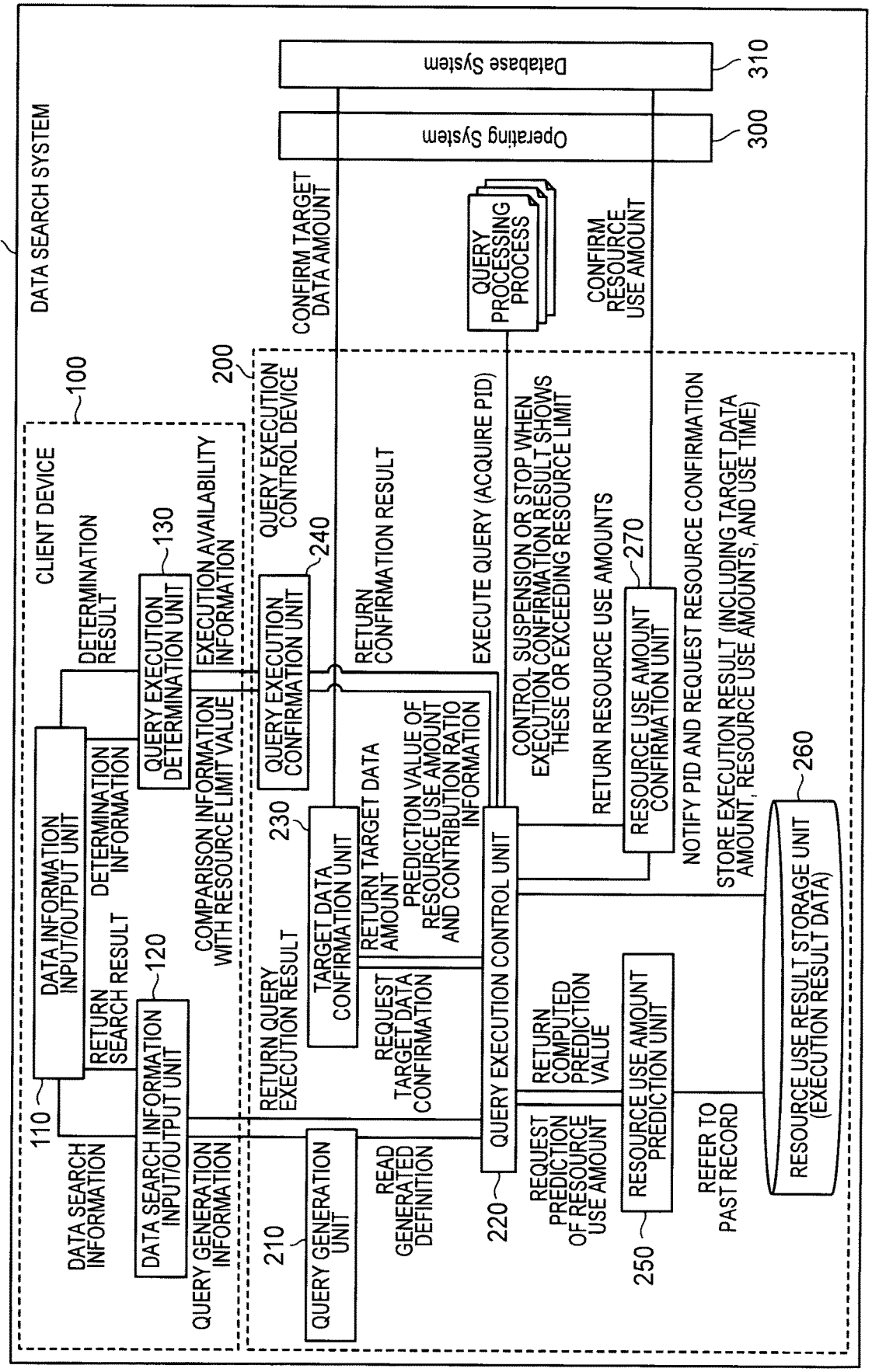

FIG. 4

| INFORMATION TYPE | VALUE |
|---|---|
| SEARCH TARGET TABLE | SALES TABLE |
| SEARCH CONDITION | PERIOD FROM-TO, PRODUCT, REGION, PRICE, QUANTITY |

FIG. 5

| QUERY PROCESSING NAME | TARGET DATA AMOUNT | | | RESOURCE USE AMOUNT | |
|---|---|---|---|---|---|
| | TYPE | TYPE SPECIFICATION | CONFIRMATION MEANS | TYPE | CONFIRMATION MEANS |
| FIRST QUERY PROCESSING | SQL | ······ (SEE FIG. 6) | ······ (SEE FIG. 7) | CPU USE TIME | tasklist /fi "PID eq %TARGETPID%" /v |
| | | | | MEMORY USE AMOUNT | tasklist /fi "PID eq %TARGETPID%" /v |

FIG. 6

| TYPE | TYPE SPECIFICATION |
|---|---|
| SQL | SELECT * FROM %TARGETTABLE% WHERE "CON1" and "CON2"; |

FIG. 7

| CONFIRMATION STEP | PROCESSING | |
|---|---|---|
| | CONFIRMATION DETAILS | CONFIRMATION MEANS |
| STEP1 | ACQUISITION OF ROW ID OF TARGET RECORD | SELECT ROWNUM FROM %TARGETTABLE% WHERE "CON1" and "CON2" ; |
| STEP2 | ACQUISITION OF COLUMN NAME OF TARGET TABLE | SHOW COLUMNS FROM %TARGETTABLE% ; |
| STEP3 | DEFINITION OF ACQUISITION EXPRESSION | SELECT LENGTHB(%TARGETCOLUM%) FROM %TARGETTABLE% WHERE ROWNUM = %ROWID% |
| STEP4 | ACQUISITION OF TOTAL DATA AMOUNT OF ONE RECORD (UNIT: BYTE) | SUBSTITUTE ACQUIRED COLUMN NAME FOR %TARGETCOLUM% OF <STEP3>, REPEAT OPERATION WITH ALL ACQUIRED COLUMN NAMES IN <STEP2>, AND OBTAIN TOTAL VALUE OF RESULTS. |
| STEP5 | ACQUISITION OF TARGET DATA AMOUNT (UNIT: BYTE) | SUBSTITUTE ACQUIRED ROW ID FOR %ROWID% OF <STEP3>, REPEAT OPERATION OF <STEP4> WITH ALL ACQUIRED ROW IDS IN <STEP1>, AND OBTAIN TOTAL VALUE OF RESULTS. |

FIG. 8

| QUERY PROCESSING NAME | EXECUTION INFORMATION | | | TARGET DATA AMOUNT | RESOURCE USE AMOUNT | |
|---|---|---|---|---|---|---|
| | START TIME | TYPE | TYPE SPECIFICATION | VALUE | TYPE | VALUE |
| SECOND QUERY PROCESSING | 2016/9/20 13:45:00 | SQL | SELECT * FROM SALES TABLE WHERE PRODUCT="A"; | 1,242,689 | CPU USE TIME | 00:01:30 |
| | | | | | MEMORY USE AMOUNT | 1,254,000 |
| | 2016/9/20 13:45:00 | SQL | SELECT * FROM PRODUCT MASTER WHERE PRODUCT="A"; | 654,381 | CPU USE TIME | 00:00:18 |
| | | | | | MEMORY USE AMOUNT | 655,000 |
| THIRD QUERY PROCESSING | 2016/9/20 13:45:10 | SQL | SELECT * FROM SALES TABLE WHERE QUANTITY≥"100"; | 3,118,365 | CPU USE TIME | 00:02:02 |
| | | | | | MEMORY USE AMOUNT | 3,200,000 |
| FOURTH QUERY PROCESSING | 2016/9/20 13:45:13 | SQL | SELECT * FROM STOCK TABLE WHERE REGION="TOKYO"; | 2,998,321 | CPU USE TIME | 00:01:49 |
| | | | | | MEMORY USE AMOUNT | 2,999,000 |

FIG. 9

| TARGET DATA AMOUNT | RESOURCE USE AMOUNT ||
|---|---|---|
| VALUE | CPU USE TIME | MEMORY USE AMOUNT |
| 1,242,689 | 00:01:30 | 1,254,000 |
| 654,381 | 00:00:18 | 655,000 |
| 3,118,365 | 00:02:02 | 3,200,000 |
| 2,998,321 | 00:01:49 | 2,999,000 |

FIG. 13

| CONTRIBUTION RATIO (R-SQUARE VALUE) | QUALITATIVE EVALUATION | VALUE OF SAFETY RATIO $\alpha$ |
|---|---|---|
| 1.0 | ACCORD | 1.0 TIMES |
| 0.9 TO 1.0, EXCLUSIVE OF 1.0 | VERY GOOD | 1.2 TIMES |
| 0.7 TO 0.9, EXCLUSIVE OF 0.9 | GOOD | 1.5 TIMES |
| 0.5 TO 0.7, EXCLUSIVE OF 0.7 | AVERAGE | 2.0 TIMES |
| LESS THAN 0.5 | NOT GOOD | 3.0 TIMES |

DATA SEARCH METHOD, DATA SEARCH DEVICE, AND DATA SEARCH PROGRAM

This application is based upon and claims the benefit of priority from Japanese patent application No. 2016-249717, filed on Dec. 22, 2016, the disclosure of which is incorporated here in its entirety by reference.

BACKGROUND

Technical Field

The present invention relates to a data search method, a data search device, and a data search program, and in particular to a data search method, a data search device, and a data search program capable of dynamically changing resource limit values.

Background Art

A query management product in the data management field executes processing in accordance with a group of programs that make inquiries (processing requests) to a database management system. The inquiry issued by the query management product to the database management system is called query.

For example, when an extraction condition and arrangement of tables or data to be processed are specified, the query management product first acquires an inquiry result. Next, the query management product executes rearrangement processing, grouping processing, or filter processing for the inquiry result according to the specification. Also, the query management product can generate data, copy data, delete data, change data, etc.

The type of query issued by the query management product depends on the type and specification of a database to be managed by the database management system. For example, when an object to be managed is a relational database (RDB), the query is typically described in structured English query language (SQL). Further, when the object to be managed is an extensible markup language (XML) database, the query is often described in XQuery.

Further, the query called "search query" is not a query distinguished by the description method as described above, but is a query in which a search condition to be used when a user wishes to search for data, using a search engine, is described.

When using a search engine such as Google (registered trademark), a keyword input by the user into a search window is also called search query. That is, the user who inputs the keyword into the search window unconsciously makes an inquiry to a huge database.

When a database management system, which manages the RDB, the XML database, or the like, performs data search, using a search query, various resources in a computer are used. The resources to be used are shared resources in the computer such as a central processing unit (CPU), a memory, a disk, a communication network, and the like.

Various processes executed on the computer use the above-described resources. That is, if the amount searched by the data search is large, the resources are exhausted, waiting for processing due to the exhaustion of the resources occurs, and processing time of other processes is affected. Therefore, a mechanism to limit the resource amount used in the data search and minimize the influence on other processing is implemented in the database management system.

As a method of limiting the resource amount used in the data search, for example, there is a method of setting a limit value of an amount of data stored in a database or the like, which is to be cached in a memory before the data search is executed.

There is also a method of setting an upper limit value of the number of processes to be executed at the same time when the data search is executed. Further, there is a method of first measuring only the number of data acquisitions, then comparing a preset upper limit value with the measured number of data acquisitions, and then controlling the search, when the data search is executed.

Further, there is a method of notifying, when the measured number of data acquisitions exceeds an upper limit value, an alert to a request source of data search, and prompting the request source to determine whether continuing the data search, thereby not to secure resources more than necessary for search query execution processing.

When the resource amount used in the data search depends on content of the search query execution processing, it is required to estimate a maximum value in advance and secure a memory with a value that is larger than the maximum value by a predetermined ratio as a cache. For example, when the capacity of the database to be searched is 1 TB, the database is searched for data of 1 TB at the maximum, and thus it is required to secure a memory of about 1.3 TB that is larger than 1 TB as a cache.

If only a memory with a value that is slightly larger than an average value of a search amount is secured as a cache, cached data becomes smaller than cached data in a case where a memory with a value that is larger than the maximum value by the predetermined ratio is secured as a cache. That is, a hit ratio of the cache is decreased, and search efficiency and search speed are decreased.

CITATION LIST

Patent Literature

PTL 1: Japanese Patent Application Laid-Open No. 2015-106219
PTL 2: Japanese Patent Application Laid-Open No. 2008-234430
PTL 3: Japanese Patent Application Laid-Open No. 2006-040081
PTL 4: International Patent Application Publication No. 2008/038342

SUMMARY

An exemplary object of the present invention is to provide a data search method, a data search device, and a data search program capable of dynamically changing an upper limit value of a resource amount usable in search query execution processing.

A data search method according to the present invention includes predicting a resource amount to be used in query processing scheduled to be executed, using a relationship between query processing executed in a past and a resource amount used in the query processing, and changing an upper limit value of a resource amount usable in query processing to the predicted resource amount to be used in the query processing scheduled to be executed for which execution has been permitted.

A data search device according to the present invention includes a prediction unit configured to predict a resource amount to be used in query processing scheduled to be executed, using a relationship between query processing executed in a past and a resource amount used in the query processing, and a change unit configured to change an upper limit value of a resource amount usable in query processing to the predicted resource amount to be used in the query processing scheduled to be executed for which execution has been permitted.

A data search program according to the present invention causes a computer to execute a prediction process of predicting a resource amount to be used in query processing scheduled to be executed, using a relationship between query processing executed in a past and a resource amount used in the query processing, and a change process of changing an upper limit value of a resource amount usable in query processing to the predicted resource amount to be used in the query processing scheduled to be executed for which execution has been permitted.

BRIEF DESCRIPTION OF THE DRAWINGS

FIG. 3 is a block diagram showing a configuration example of a data search system according to a second exemplary embodiment of the present invention.

FIG. 4 is an explanatory diagram showing an example of data search information input to a data information input/output unit 110.

FIG. 5 is an explanatory diagram showing an example of query definition information generated by a query generation unit 210.

FIG. 6 is an explanatory diagram showing an example of an execution query generated by the query generation unit 210.

FIG. 7 is an explanatory diagram showing an example of target data amount confirmation means generated by the query generation unit 210.

FIG. 8 is an explanatory diagram showing an example of resource use result information stored in a resource use result storage unit 260.

FIG. 9 is an explanatory diagram showing another example of the resource use result information stored in the resource use result storage unit 260.

FIG. 13 is an explanatory diagram showing examples of correspondence relationship between a contribution ratio and a safety ratio.

DESCRIPTION OF EXEMPLARY EMBODIMENT

First Exemplary Embodiment

Hereinafter, an exemplary embodiment of the present invention will be described with reference to the drawings.

Figure 1:
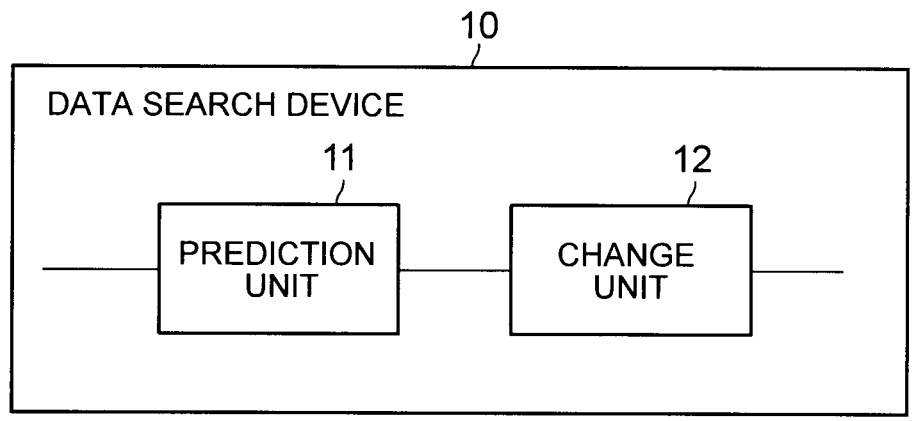
FIG. 1 is a block diagram showing a configuration example of a data search device according to a first exemplary embodiment of the present invention.

FIG. 1 is a block diagram showing a configuration example of a data search device according to a first exemplary embodiment of the present invention. A data search device 10 according to the present invention includes a prediction unit 11 (for example, a resource use amount prediction unit 250) that predicts a resource amount to be used in query processing scheduled to be executed, using a relationship between query processing executed in a past and a resource amount used in the query processing, and a change unit 12 (for example, a query execution control unit 220) that changes an upper limit value of a resource amount usable in query processing to the predicted resource amount to be used in the query processing scheduled to be executed for which execution has been permitted.

Figure 2:
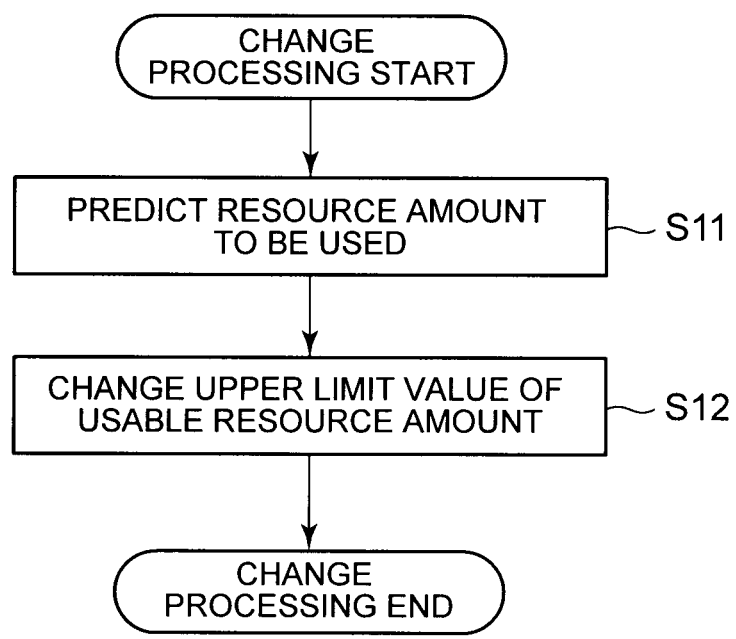
FIG. 2 is a flowchart showing an operation of change processing by a data search device 10 of the first exemplary embodiment.

Hereinafter, change processing by the data search device 10 will be described. FIG. 2 is a flowchart showing an operation of the change processing by the data search device 10 of the first exemplary embodiment.

The prediction unit 11 predicts a resource amount to be used in query processing scheduled to be executed, using a relationship between query processing executed in the past and a resource amount used in the query processing (step S11).

Next, the change unit 12 changes an upper limit value of a resource amount usable in query processing to the predicted resource amount to be used in the query processing scheduled to be executed for which execution has been permitted (step S12). After the change, the data search device 10 terminates the change processing.

With such a configuration, the data search device can dynamically change the upper limit value of the resource amount usable in the search query execution processing.

Further, the prediction unit 11 may predict the resource amount to be used in the query processing scheduled to be executed, on the basis of a data amount to be handled in the query processing scheduled to be executed, using a relationship between a data amount handled in the query processing executed in the past and the resource amount used in the query processing.

With such a configuration, the data search device can estimate the resource amount to be used in the search query execution processing, using the amount of data searched in the search query execution processing.

Further, the data search device 10 may include a determination unit (for example, a query execution determination unit 130 and a query execution confirmation unit 240) that determines whether permitting execution of the query processing scheduled to be executed on the basis of the predicted resource amount to be used in the query processing scheduled to be executed.

With such a configuration, the data search device can stop the execution of the query processing with a resource use amount that is predicted to be large.

Further, the data search device 10 may include a confirmation unit (for example, a target data confirmation unit 230) that confirms the data amount to be handled in the query processing scheduled to be executed, and the determination unit may determine whether permitting execution of the query processing scheduled to be executed on the basis of the confirmed data amount.

With such a configuration, the data search device can stop the execution of the query processing with a data amount that is confirmed to be large.

Further, the data search device 10 may include an execution unit (for example, a query execution control unit 220) that executes the query processing scheduled to be executed for which execution has been permitted, and a recording unit (for example, the query execution control unit 220) that records the resource amount used in the executed query processing.

With such a configuration, the data search device can accumulate the resource amount used in the query processing and the query processing executed in the past.

Further, the data search device 10 may include a generation unit (for example, a query generation unit 210) that generates the query processing scheduled to be executed on the basis of information indicating a data search condition.

With such a configuration, the data search device can generate an execution query on the basis of the search condition of data input from a user.

Further, the generating unit may generate means for confirming the resource amount to be used.

Further, the recording unit may record the data amount handled in the executed query processing.

Second Exemplary Embodiment

[Description of Configuration]

Hereinafter, a second exemplary embodiment of the present invention will be described with reference to the drawings. FIG. 3 is a block diagram showing a configuration example of a data search system according to the second exemplary embodiment of the present invention.

As showed in FIG. 3, a data search system 20 includes a client device 100, a query execution control device 200, an operating system 300, and a database system 310.

To solve the above problem, the data search system 20 of the present exemplary embodiment provides a mechanism to dynamically change a resource limit value at the time of query execution. Note that the limit value in the present exemplary embodiment means an upper limit value of a resource amount usable in query processing. The data search system 20 has the following three characteristics.

As a first characteristic, the data search system 20 has means for confirming a target data amount that is a data amount handled in the query processing. The data search system 20 confirms the target data amount immediately before executing a query and determines whether executing the processing. Further, the data search system 20 records the confirmed target data amount.

The target data amount includes various data amounts according to the query processing. For example, in a case of database search, the target data amount is a size of target data searched in the query processing. Further, in a case of importing and exporting of file data, the target data amount is a disk size of a target file. Note that the file includes an image file, an audio file, and the like, in addition to a text file.

As a second characteristic, the data search system 20 has means for acquiring a resource use amount by the query processing. The data search system 20 acquires each resource use amount by means corresponding to each resource at the time of query execution. In addition, the data search system 20 accumulates an obtained actual value together with the target data amount of the query processing.

As a third characteristic, the data search system 20 estimates the resource use amount of query processing that is to be newly executed before the query processing is executed, on the basis of the target data amount of the query processing executed in the past and the actual value of the resource use amount of the query processing. The data search system 20 estimates the resource use amount, when the target data amount of the query processing becomes known.

When exactly the same processing is executed including a data source such as a database, the resource use amount and processing time are basically unchanged. However, when the processing amount is different, that is, when the data amount (target data amount) handled in each processing is different, the resource use amount and the processing time are changed.

Therefore, the data search system 20 of the present exemplary embodiment estimates the resource use amount on the basis of the target data amount of the query processing that is to be newly executed, using the relationship between the target data amount accumulated as a past record and the resource use amount. The relationship between the target data amount and the resource use amount is generated for each type of resource. The data search system 20 estimates the resource use amount for each type of resource.

Next, the data search system 20 reflects, on the resource limit value, a prediction value of the resource use amount in which a safety ratio is taken into consideration at a predetermined ratio. By being changed for each execution of the query processing, a relatively small value is set as the resource limit value, when it is estimated that the resource use amount of the target query processing is small.

Further, when it is estimated that the resource use amount of the target query processing is large, a relatively large value is set as the resource limit value. Further, the data search system 20 can determine whether executing the query processing on the basis of information of a more specific resource use amount.

The client device 100 is a device used by a user of the data search system 20. The client device 100 includes a data information input/output unit 110, a data search information input/output unit 120, and a query execution determination unit 130.

The data information input/output unit 110 has a function to output data input by the user and output data to the user. The data information input/output unit 110 inputs data search information input by the user to the data search information input/output unit 120. Further, the data information input/output unit 110 displays a search result returned from the data search information input/output unit 120 toward the user.

FIG. 4 is an explanatory diagram showing an example of the data search information input to the data information input/output unit 110. The data search information showed in FIG. 4 is composed of an information type and a value.

FIG. 4 shows a search target table and search conditions as the information types. In the search target table, a name of the table to be searched is specified. Further, a column name and the like of the table used for the search are specified as the search conditions.

Further, the data information input/output unit 110 displays information for determination of process continuation of query execution returned from the query execution determination unit 130 toward the user. The data information input/output unit 110 returns information indicating whether continuing query execution input by the user to the query execution determination unit 130.

The data search information input/output unit 120 has a function to input information to be used for query generation to the query generation unit 210 on the basis of the data search information input from the data information input/output unit 110. Further, the data search information input/output unit 120 returns an execution result of the query returned from the query execution control unit 220 to the data information input/output unit 110.

The query execution determination unit 130 has a function to determine whether executing the query on the basis of the notified prediction value of the resource use amount or the target data amount. The query execution determination unit 130 is notified of information regarding the prediction value of the resource use amount or the target data amount from the query execution confirmation unit 240.

The query execution determination unit 130 inputs the information for determination of process continuation of query execution to the data information input/output unit 110. Further, the query execution determination unit 130 returns the information indicating whether continuing query execution returned from the data information input/output unit 110 to the query execution confirmation unit 240.

The query execution control device 200 is a device that controls execution of a query. Since the query execution control device 200 directly controls execution of individual queries, the query execution control device 200 properly grasps an execution status of the query processing, the target data amount, and the resource use amount. By estimating the resource use amount on the basis of the target data amount and the actual value of the resource use amount, the query execution control device 200 can control the setting of the resource limit value with higher accuracy.

The query execution control device 200 includes the query generation unit 210, the query execution control unit 220, the target data confirmation unit 230, the query execution confirmation unit 240, the resource use amount prediction unit 250, a resource use result storage unit 260, and a resource use amount confirmation unit 270.

The query generation unit 210 has a function to generate an execution query and a confirmation query in a description method such as SQL on the basis of information input from the data search information input/output unit 120. In addition, the query generation unit 210 generates confirmation means for the resource use amount, and the like, by the execution query processing process. The query generation unit 210 inputs query definition information indicating generated information to the query execution control unit 220.

FIG. 5 is an explanatory diagram showing an example of the query definition information generated by the query generation unit 210. As showed in FIG. 5, the query definition information is composed of a query processing name, a target data amount, and a resource use amount.

The query processing name is information for identifying the query process to be executed. The target data amount indicates information used to confirm the data amount searched in the query processing indicated by the query processing name. The resource use amount indicates a type of the use amount and confirmation means for confirming the use amount. As showed in FIG. 5, first query processing uses two resources of the CPU and the memory.

Each confirmation means showed in FIG. 5 is means for confirming the resource use amount by issuing a command prepared in a general Windows (registered trademark) operating system or a database system. Note that the confirmation means may be means for confirming the resource use amount by a method other than the method showed in FIG. 5.

A type of the target data amount showed in FIG. 5 is a type of the query. The type "SQL" means that the query is described in SQL.

Further, an example of a type specification of the target data amount showed in FIG. 5 is showed in FIG. 6. FIG. 6 is an explanatory diagram showing an example of an execution query generated by the query generation unit 210.

Further, an example of the confirmation means of the target data amount showed in FIG. 5 is showed in FIG. 7. FIG. 7 is an explanatory diagram showing an example of target data amount confirmation means generated by the query generation unit 210. The target data amount confirmation means showed in FIG. 7 includes a step of executing the confirmation query generated in the query generation unit 210. By executing confirmation steps of STEP 1 to STEP 5 showed in FIG. 7, the target data confirmation unit 230 confirms the target data amount.

The query execution control unit 220 has a function to control execution of the entire query processing in cooperation with configuration elements. The query execution control unit 220 controls execution of the query processing on the basis of the query definition information input from the query generation unit 210. To be specific, the query execution control unit 220 activates or stops a query execution process.

Further, the query execution control unit 220 requests the target data confirmation unit 230, the query execution confirmation unit 240, the resource use amount prediction unit 250, and the resource use amount confirmation unit 270 to execute processing, and acquires processing results. Next, the query execution control unit 220 controls execution of the query processing on the basis of the acquired processing results.

To be specific, when the prediction value of the resource use amount exceeds the limit value, the query execution control unit 220 suspends the execution of the query processing. Further, the query execution control unit 220 may forcibly stop the query processing being executed. Further, the query execution control unit 220 records the actual value of the resource used in the query processing to the resource use result storage unit 260.

The query execution control unit 220 acquires a process ID of a query processing process from the operating system 300 at the time of query execution. The query processing process showed in FIG. 3 shows a group of processing processes operated in the operating system 300. The query processing process includes a confirmation query processing process and an execution query processing process.

The target data confirmation unit 230 has a function to execute a confirmation query generated in the query generation unit 210. By execution of the confirmation query, the target data confirmation unit 230 acquires information indicating the target data amount from the database system 310. The target data confirmation unit 230 returns the acquired information to the query execution control unit 220.

The query execution confirmation unit 240 has a function to input the information regarding the target data amount acquired by the target data confirmation unit 230 to the query execution determination unit 130. Further, the query execution confirmation unit 240 determines whether the input prediction value of the resource use amount exceeds the limit value. Further, the query execution confirmation unit 240 returns the information indicating whether continuing query execution returned from the query execution determination unit 130 to the query execution control unit 220.

The resource use amount prediction unit 250 has a function to predict the resource use amount in response to a prediction request of the resource use amount from the query execution control unit 220. The resource use amount prediction unit 250 performs predetermined computation on the basis of the actual value of the resource use amount stored in the resource use result storage unit 260, and returns the resource use amount that is a computation result to the query execution control unit 220.

To be specific, the resource use amount prediction unit 250 refers to the target data amount and the resource use amount of the query processing executed in the past stored in the resource use result storage unit 260, which can be applied to the query processing scheduled to be executed. Next, the resource use amount prediction unit 250 computes a relationship between each resource use amount and the target data amount according to the query processing.

The resource use amount prediction unit 250 computes a prediction value of the resource use amount with respect to the target data amount of the query processing scheduled to be executed, using the computed relationship. The resource use amount prediction unit 250 returns the computed prediction value to the query execution control unit 220.

As the method of computing the relationship between the target data amount and the resource use amount, a known technique of computing a relational expression by fitting to a relation curve or the like can be used, in a case where a sufficient data amount of past record exists.

The resource use amount prediction unit 250 computes a relationship between the target data amount and the resource use amount in response to a request from the query execution control unit 220 immediately before execution of a target query. However, since the data to be used for the computation is stored in advance in the resource use result storage unit 260, the resource use amount prediction unit 250 may asynchronously execute the relationship computation processing at different timing from the time when receiving the request from the query execution control unit 220.

In a case where the resource use amount prediction unit 250 asynchronously executes the relationship computation processing, a computation result of the relationship is stored in the resource use result storage unit 260 for each resource used in each query processing. Further, the resource use amount prediction unit 250 omits the processing of step S108 described below.

The resource use result storage unit 260 has a function to store the target data amount and an actual use value of each resource in association with each other. The actual use value of each resource includes, for example, a maximum use amount of the resource and the use time of the resource. In the resource use result storage unit 260 of the present exemplary embodiment, the past actual values related to execution of query processing are sufficiently accumulated.

FIG. 8 is an explanatory diagram showing an example of resource use result information stored in a resource use result storage unit 260. As showed in FIG. 8, the resource use result information is composed of a query processing name, execution information, a target data amount, and a resource use amount.

The query processing name is information for identifying executed query processing. The execution information is information related to execution of the query processing indicated by the query processing name. The execution information in FIG. 8 indicates a start time, a type, and a type specification.

The target data amount is a data amount searched in the query processing indicated by the query processing name. The unit of the target data amount showed in FIG. 8 is byte. However, units other than byte may be used.

The resource use amount indicates the resource amount used in the query processing indicated by the query processing name. The resource use amount in FIG. 8 indicates a CPU use time and a memory use amount. The unit of the memory use amount showed in FIG. 8 is byte. However, units other than byte may be used. Further, the units of the CPU use time showed in FIG. 8 are minute and second. However, units other than minute and second may be used.

The CPU use time is a cumulative resource use amount. Note that, as the resource use amount, a CPU use rate that is a use amount per unit time may be recorded, other than the CPU use time.

The query execution control unit 220 of the present exemplary embodiment records a maximum value of the resource use amount confirmed by the resource use amount confirmation unit 270 as an actual value. To be specific, in the case of the CPU use time, the query execution control unit 220 records a value at the time of the end of the query processing.

Further, in the case of the memory use amount or the CPU use rate, the query execution control unit 220 records a value at timing when a maximum value is confirmed. Further, the query execution control unit 220 can record both the cumulative resource use amount and the resource use amount per unit time in the resource use result information.

FIG. 9 is an explanatory diagram showing another example of the resource use result information stored in the resource use result storage unit 260. FIG. 9 shows part of the target data amount and the resource use amount showed in FIG. 8.

Figure 10:
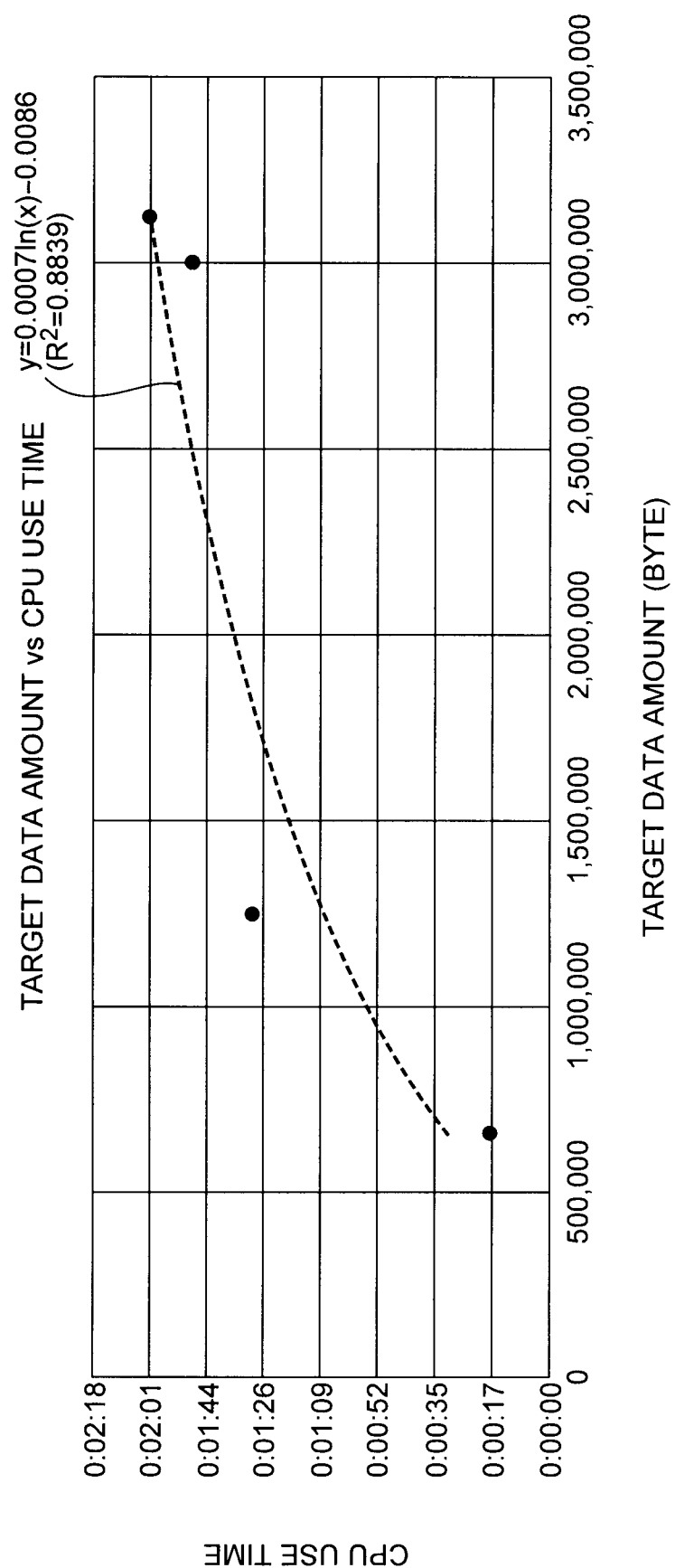
FIG. 10 is an explanatory diagram showing an example of a relationship between a target data amount and a CPU use time.
Figure 11:
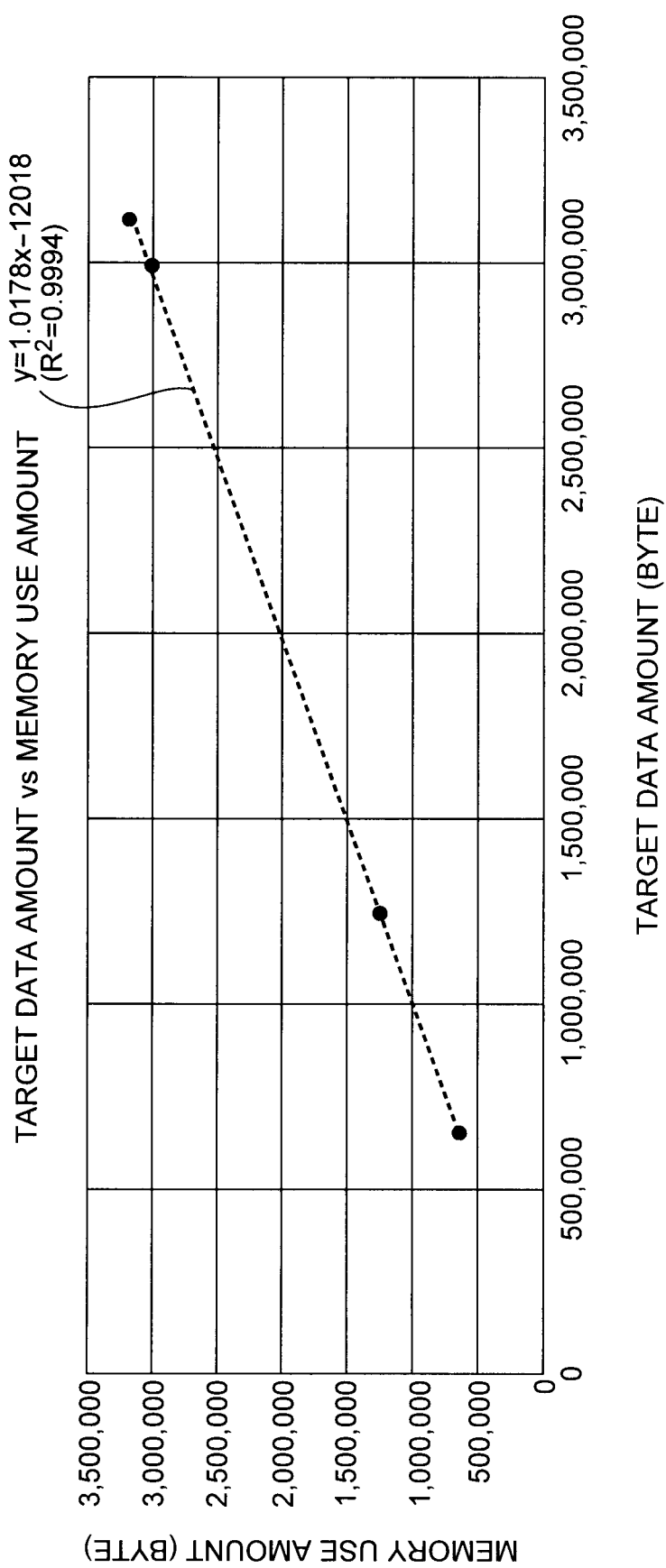
FIG. 11 is an explanatory diagram showing an example of a relationship between a target data amount and a memory use amount.

FIG. 10 is an explanatory diagram showing an example of a relationship between the target data amount and the CPU use time. The function showed in FIG. 10 is generated on the basis of the data showed in FIG. 9. FIG. 11 is an explanatory diagram showing an example of a relationship between the target data amount and the memory use amount. The function showed in FIG. 11 is generated on the basis of the data showed in FIG. 9.

The function showed in FIG. 10 and the function showed in FIG. 11 are generated using a technique for computing a relational expression by fitting to an approximation curve that indicates a relationship. In the example showed in FIG. 10, a log approximation curve is used, and in the example showed in FIG. 11, a linear approximation curve is used.

Figure 12:
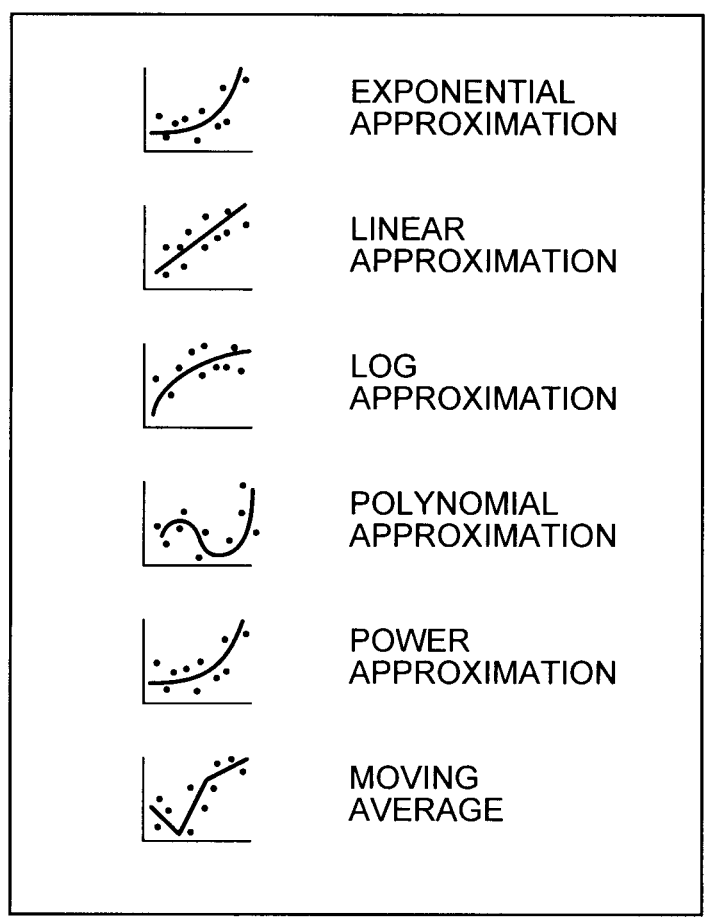
FIG. 12 is an explanatory diagram showing examples of approximation curves used for computation of a relational expression.

Note that the relational expression may be computed using an approximate curve other than the log approximation curve and the linear approximation curve. FIG. 12 is an explanatory diagram showing examples of the approximation curves used for computation of the relational expression.

There may be cases where the resource use amount does not vary regardless of the value of the target data amount, depending on the type of the resource. That is, there are resources with the resource use amount that takes a fixed value.

Hereinafter, a case of executing the first query processing showed in FIG. 5 will be considered. The actual value showed in FIG. 9 is a value usable for predicting the resource use amount of the first query processing. Assumed that the target data amount confirmation means is executed and the target data amount of the first query process is confirmed to be 2,000,000 bytes.

The resource use amount prediction unit 250 can compute the prediction values of the resource use amounts as "the CPU use time: 2 minutes 15 seconds" and "the memory use amount: 4,059,182 bytes", respectively, using the functions showed in FIGS. 10 and 11.

Next, the resource use amount prediction unit 250 computes a safety ratio on the basis of a contribution ratio ($R^2$ value) of the function, and computes the prediction value of the resource use amount in which the safety ratio is taken into consideration. In computation, the resource use amount prediction unit 250 uses the correspondence relationship showed in FIG. 13. FIG. 13 is an explanatory diagram showing examples of correspondence relationship between the contribution ratio and the safety ratio.

For example, in the example showed in FIG. 10, the contribution ratio is 0.8839, and thus the safety ratio α is 1.5 times. In the example showed in FIG. 11, the contribution ratio is 0.9994, and thus the safety ratio α is 1.2 times. The resource use amount prediction unit 250 computes the prediction value of the resource use amount as follows in consideration of the safety ratio.

The CPU use time: 2:15×1.5=3:22
The memory use amount: 4,059,182×1.2=4,871,018

The resource use amount confirmation unit 270 has a function to acquire the use amounts of the resources such as the CPU, the memory, and the disk, and a database processing time from the database system 310 for each process ID.

The resource use amount confirmation unit 270 acquires the process ID from the query execution control unit 220. Further, the resource use amount confirmation unit 270 returns the information acquired from the database system 310 to the query execution control unit 220.

The operating system 300 has functions to issue the process ID and to allocate the resources to the processes. Note that the operating system 300 of the present exemplary embodiment is compatible with general operating systems such as Windows and LINUX (registered trademark).

In the database system 310, data to be searched is accumulated. To be specific, the database system 310 stores data acquired on the basis of the data search information, and attribute data of the data. The database system 310 according to the present exemplary embodiment is compatible with general database systems such as Oracle (registered trademark), PostgreSQL (registered trademark), XMLDB, DB2 (registered trademark), and Hadoop (registered trademark).

Although the client device 100, the query execution control device 200, the operating system 300, and the database system 310 showed in FIG. 3 are described as different configuration elements, the configuration elements may be realized in the same environment. For example, the data search system 20 of the present exemplary embodiment may be realized by one physical server or one virtual server.

The data search system 20 according to the present exemplary embodiment dynamically changes the limit value of the resource amount to be used in the query processing such as data search, thereby to avoid an increase in the processing amount to unexpectedly increase the resource amount, and termination or delay of the query processing. Further, the data search system 20 can avoid occurrence of a situation in which the limit value does not make sense because the limit value is set to be large.

A known technique may be used for the processing of raising a warning or forcibly stopping the query processing when the prediction value of the resource use amount exceeds the limit value of the resource use amount.

[Description of Operation]

Figure 14:
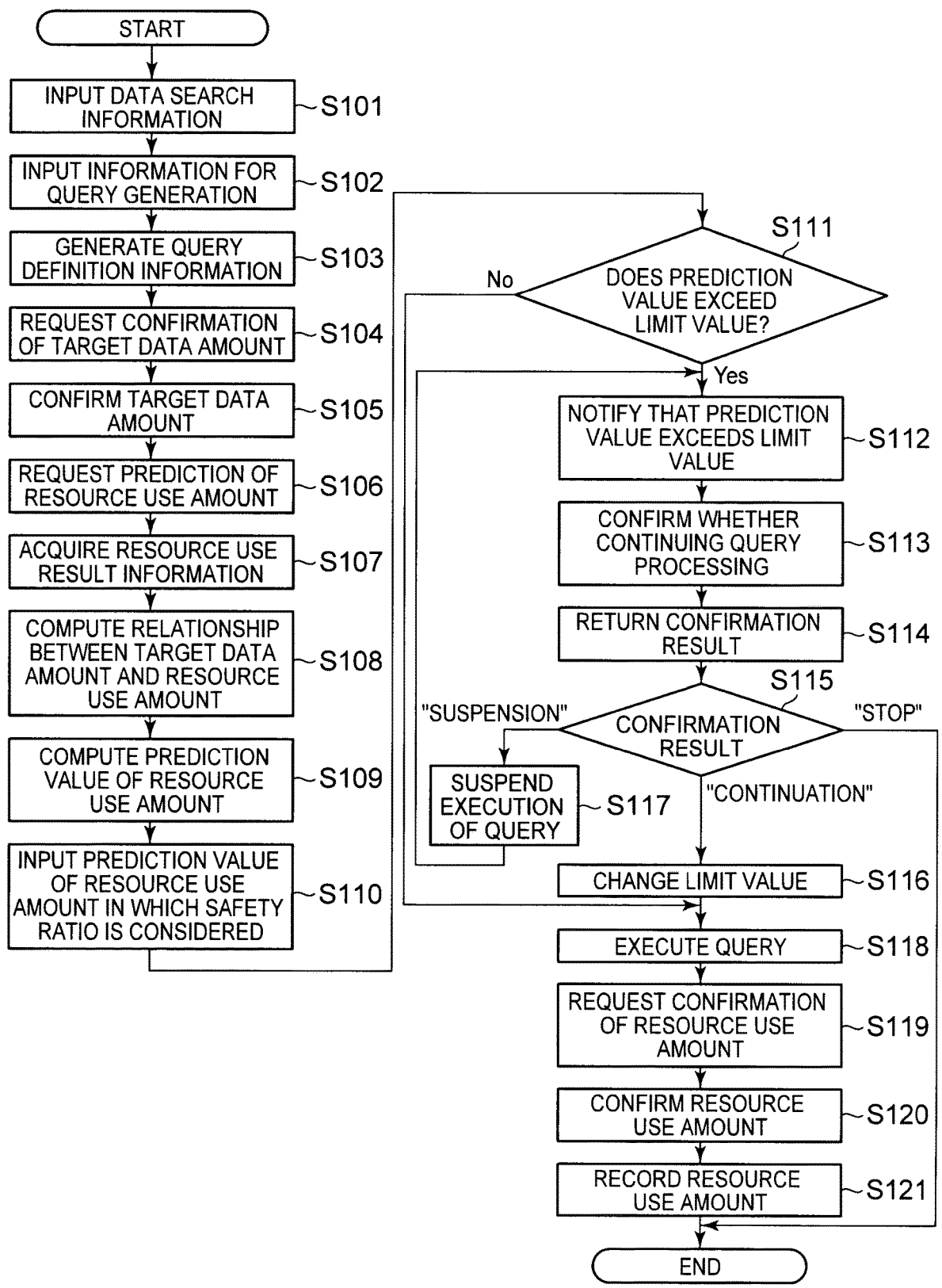
FIG. 14 is a flowchart showing an operation of query execution processing by a data search system 20 according to the second exemplary embodiment.

Hereinafter, an operation to execute a search query by the data search system 20 of the present exemplary embodiment will be described with reference to FIG. 14. FIG. 14 is a flowchart showing an operation of query execution processing by the data search system 20 according to the second exemplary embodiment.

The query execution processing showed in FIG. 14 is divided into processing of dynamically changing the limit value of the resource after estimating the resource use amount from the target data amount in advance before executing a query and determining whether executing or stopping query processing, and processing of acquiring the resource use amount and accumulating the actual value during execution of the query.

Steps S101 to S117 are processing of dynamically changing the limit value of the resource, before the query is executed. The data search information is input to the data information input/output unit 110 (step S101). Next, the data information input/output unit 110 inputs an instruction of data search to the data search information input/output unit 120.

Next, the data search information input/output unit 120 inputs the information to be used for query generation to the query generation unit 210 on the basis of the input data search information (step S102).

Next, the query generation unit 210 generates query definition information on the basis of the input information to be used for query generation (step S103). To be specific, the query generation unit 210 generates an execution query for acquiring data of a search result, and a confirmation query for confirming the target data amount to be searched in the execution query in advance.

Further, the query generation unit 210 also generates confirmation means for the resource use amount by the processing process and the like. The query generation unit 210 inputs the generated query definition information to the query execution control unit 220.

Next, the query execution control unit 220 first reads the confirmation query from the query definition information. The query execution control unit 220 requests the target data confirmation unit 230 to confirm the target data amount by notifying the target data confirmation unit 230 of the target data amount confirmation means including an execution step of the read confirmation query (step S104).

Further, the query execution control unit 220 activates the confirmation query processing process. The confirmation query processing process is a process of performing only confirmation of the target data amount. That is, the resource amount used by the confirmation query processing process is insignificant.

Next, the target data confirmation unit 230 makes inquiries to the database system 310 via the operating system 300 by executing the notified target data amount confirmation means to confirm the target data amount of the query processing (step S105). After confirming the target data amount, the target data confirmation unit 230 returns a confirmation result to the query execution control unit 220.

Next, the query execution control unit 220 notifies the resource use amount prediction unit 250 of the query processing name and the target data amount obtained in step S105. That is, the query execution control unit 220 requests the resource use amount prediction unit 250 to predict the resource amount to be used in the query processing scheduled to be executed (step S106).

The query processing name used in step S106 is a value as identification information used by the resource use amount prediction unit 250 to acquire unique information from the resource use result information in the resource use result storage unit 260. That is, information other than the query processing name may be used as long as the information is usable as identification information.

Next, the resource use amount prediction unit 250 acquires the resource use result information including the query processing name notified from the query execution control unit 220 from the resource use result storage unit 260 (step S107).

Next, the resource use amount prediction unit 250 computes the relationship between the target data amount included in the acquired resource use result information and the resource use amount of each resource (step S108). As described above, the processing of step S108 may be omitted.

Next, the resource use amount prediction unit 250 computes the prediction value of the resource use amount on the basis of the target data amount of the query processing scheduled to be executed notified from the query execution control unit 220, using the relationship between the target data amount and each resource use amount obtained in step S108 (step S109).

Further, the resource use amount prediction unit 250 also computes the contribution ratio of the relationship between the target data amount and each resource use amount. The resource use amount prediction unit 250 returns computation results to the query execution control unit 220.

Next, the resource use amount prediction unit 250 computes the safety ratio on the basis of the returned contribution ratio. Next, the resource use amount prediction unit 250 computes the prediction value of the resource use amount in which the safety ratio is taken into consideration. The resource use amount prediction unit 250 inputs the computed prediction values to the query execution confirmation unit 240 (step S110).

The query execution confirmation unit 240 compares the prediction value of the resource use amount in which the safety ratio is taken into consideration and the resource use limit value, and confirms whether the prediction value exceeds the limit value (step S111). The query execution confirmation unit 240 may compare the prediction value and a physical resource availability limit value, instead of the resource use limit value. Also, the prediction value used for the comparison may be a prediction value before the safety ratio is taken into consideration.

Note that the resource use limit value of the present exemplary embodiment is a value set in advance such as a value of 80% of the physical resource availability limit value. In addition, the resource use limit value is an arbitrarily changeable value.

When the prediction value exceeds the limit value (Yes in step S111), the query execution confirmation unit 240 notifies the query execution determination unit 130 of information indicating that the prediction value exceeds the limit value (step S112). When the prediction value is equal to or less than the limit value (No in step S111), the query execution control unit 220 performs the processing of step S118.

The query execution determination unit 130 inputs the information for determination of process continuation of the query execution to the data information input/output unit 110. The data information input/output unit 110 outputs, to the user, information for confirming whether continuously executing the query processing on the basis of the input information (step S113).

The user inputs information indicating whether continuing the query execution to the data information input/output unit 110 by reference to the output information. The data information input/output unit 110 returns the input information to the query execution determination unit 130. Next, the query execution determination unit 130 notifies the query execution confirmation unit 240 of the returned information. Next, the query execution confirmation unit 240 returns a confirmation result to the query execution control unit 220 (step S114).

In this example, the confirmation result returned to the query execution control unit 220 indicates any of "continue processing", "stop processing", and "suspend processing". The query execution control unit 220 refers to the returned confirmation result (step S115).

When the confirmation result indicates the "continue processing" ("continuation" in step S115), the query execution control unit 220 sets the prediction value of the resource use amount computed in step S110 as a new resource limit value (step S116).

Next, the query execution control unit 220 starts execution of the target query processing (step S118). When the prediction value is equal to or less than the limit value (No in step S111), the query execution control unit 220 also starts execution of the target query processing (step S118).

When the confirmation result indicates the "stop processing" ("stop" in step S115), the query execution control unit 220 does not start execution of the target query processing. Also, the query execution control unit 220 does not reset the resource limit value. The data search system 20 terminates the query execution processing.

When the confirmation result indicates the "suspend processing" ("suspension" in step S115), the query execution control unit 220 suspends the execution of the query processing for a predetermined time (step S117). After the predetermined time has passed, the data search system 20 executes the processing of step S112 again.

Steps S119 to S121 are processing during the query execution. After start of execution of the query processing, the query execution control unit 220 notifies the resource use amount confirmation unit 270 of a value that can uniquely identify the target execution query processing process and the confirmation means for the resource use amount for the target execution query processing process obtained from the query generation unit 210. With the notification, the query execution control unit 220 requests the resource use amount confirmation unit 270 to confirm the resource use amount (step S119).

The value that can uniquely identify the execution query processing process is, for example, a process ID. The process ID is obtained at the time of activation of the execution query processing process. Meanwhile, the confirmation means for the resource use amount for the execution query processing process has already been generated in step S103.

Next, the resource use amount confirmation unit 270 executes the notified confirmation means for the resource use amount for the target query, for a query processing execution device such as a server including the operating system 300 and the database system 310, using the notified value that can uniquely identify the execution query processing process. By the execution, the resource use amount confirmation unit 270 confirms each resource use amount of the target query processing (step S120).

The resource use amount confirmation unit 270 repeatedly confirms the resource use amount at predetermined time intervals. Next, the query execution control unit 220 records the maximum value of the resource use amount confirmed by the resource use amount confirmation unit 270 to the resource use result storage unit 260 (step S121). After the recording, the data search system 20 terminates the query execution processing.

In this example, the method of comparing, determining, or setting the prediction value of the resource use amount in which the safety ratio of a predetermined ratio is taken into consideration has been described. However, a similar method is applicable to the prediction value in which the safety ratio is not taken into consideration.

[Description of Effect]

The data search system 20 of the present exemplary embodiment can decrease the possibility of unexpected suspension or stop of the query processing when the data amount of the search target is increased and the resource amount to be used is increased, in a case where the resource limit value is fixed.

In a case where the resource limit value is fixed, when a data amount larger than the value indicated by the accumulated past record is searched, there is a possibility that the resource use amount exceeds the resource limit value. Therefore, forced termination or the like of the query processing may occur. However, in the present exemplary embodiment, the query execution control unit 220 dynamically changes the resource limit value, using the prediction value of the resource use amount. Therefore, the forced termination of the query processing is prevented.

Further, the data search system 20 according to the present exemplary embodiment can prevent a situation where the limit value does not make sense because the value is too large or a situation where the resources used in other processing are affected, when the fixed limit value is larger than a threshold at which a failure or the like occurs when exceeded. In particular, continuation of a situation where a large resource limit value remains set even if a data amount smaller than the value indicated by the accumulated past record is searched is prevented.

Further, the data search system 20 of the present exemplary embodiment grasps the search target data amount and expected resource use amount immediately before a query is executed. Therefore, the influence on the system when the target query is executed can be detected in advance. The influence on the system is, for example, resource pressure and resource exhaustion.

After grasping the influence on the system, the data search system 20 starts execution of the query when it is in a query executable state. In addition, in the case where execution of the query is difficult, the data search system 20 can suspend or stop the execution of the query. Therefore, the data search system 20 can handle "killer query processing" that is the query processing occupying the resource amount equal to or larger than the expected value.

PTL 4 discloses a connection control method of preventing a delay of other processing being executed by performing control in consideration of an increase in a load after connection is permitted when a client process is connected to a server process. In the present exemplary embodiment, prediction is performed on the basis of the past actual value unlike the prediction method described in PTL 4.

The resource use amount predicted in the present exemplary embodiment is a value usable as an index when performing optimum scheduling. The upper limit value of the resource use amount of each query processing is determined in advance. An administrator of the query processing, who uses the resource use amount as an index, can set an optimum execution schedule of the query processing in which free resources are as few as possible and each query processing can be efficiently executed so that the index does not exceed the upper limit value.

Further, the data search system 20 of the present exemplary embodiment is a system usable as a resource controller incorporated in a process execution processing method realized by a plurality of distributed processing devices in a physical server environment or a virtual server environment etc. The process execution processing method is, for example, a query processing method in a database search system, an update processing method in a file update system, or a registration processing method in an image and voice registration system.

Further, the resource use amount predicted in the present exemplary embodiment is a value that can be utilized as an index when designing an optimum system. For example, the resource use amount is utilized as an index in server configuration design, resource design (performance design), or data migration design. The data search system 20 can present an index in the design of the physical server or the virtual server, or can control the design under an environment where the usable resource amount is limited on the basis of the accumulated execution result data.

For example, if the administrator who predicted that three servers are required to execute the search query processing uses the above index, the administrator may be able to estimate in advance that two servers are enough for execution of the search query processing. In addition, the administrator may be able to estimate in advance that ten servers are required to keep the data migration time within 5 hours.

The data search device 10, the client device 100 of the data search system 20, and the query execution control device 200 of the exemplary embodiments are realized by, for example, a CPU that executes processing according to a program stored in a storage medium. That is, the prediction unit 11, the change unit 12, the data information input/output unit 110, the data search information input/output unit 120, the query execution determination unit 130, the query generation unit 210, the query execution control unit 220, the target data confirmation unit 230, the query execution confirmation unit 240, the resource use amount prediction unit 250, and the resource use amount confirmation unit 270 are realized by the CPU that executes the processing according to program control. The data search device 10, the client device 100, and the query execution control device 200 may be realized by a processing unit (for example, a graphics processing unit (GPU)) other than the CPU.

Further, the resource use result storage unit 260 is realized by, for example, a random access memory (RAM).

Further, each unit in the data search device 10 and each unit in the data search system 20 of the exemplary embodiments may be realized by a hardware circuit. As an example, each of the prediction unit 11, the change unit 12, the data information input/output unit 110, the data search information input/output unit 120, the query execution determination unit 130, the query generation unit 210, the query execution control unit 220, the target data confirmation unit 230, the query The execution confirmation unit 240, the resource use amount prediction unit 250, the resource use result storage unit 260, and the resource use amount confirmation unit 270 is realized by a large scale integration (LSI). Further, the aforementioned units may be realized by one LSI.

The limit value in a typical restriction method for the resource amount used in the data search is often a set value larger by a predetermined ratio than a threshold at which a failure or the like occurs when exceeded. That is, a situation may occur in which resources are consumed in large amounts even when data to be processed in the search query execution processing is small. In the above example, it is inefficient to secure 1.3 TB of memory as a cache if a 100 MB cache is sufficient for the data search.

That is, a situation in which resources are wastefully consumed for the data search exists. Further, the amount of data handled is rapidly increasing. There is an upper limit on the amount of physical resources such as hardware including a server, and thus it is important to efficiently and appropriately allocate the limited resources to each processing. The above problem is caused by the fact that the limit value of the resource is fixed.

In addition, since some information such as the number of data acquisitions is acquired with an unknown number of columns and an unknown amount of data in a column, the resource consumption may not be able to be correctly grasped when only a part of the information such as the number of data acquisitions is used. That is, when execution permission of the search query is determined only with a part of the information, there may be a situation where consumption of a large amount of resources is grasped only after the search query is executed. The above problem is caused by insufficiency of information to be determined.

Occurrence of the above-described situations is not favorable for operation of the database management system. Furthermore, in a situation where the resource amount required by the query processing scheduled to be executed exceeds a usable total resource amount, preliminary detection of the exceeding of the resource amount required by the query processing may be better. As a result of the detection, measures such as stop of the execution of the search query processing and shift of the execution timing of the processing are performed.

The distributed data virtualization system described in PTL 1 is a system that efficiently executes distributed queries, using one or a plurality of data virtualization devices. Further, the query processing device described in PTL 2 is a device that can optimize the accuracy of a more advanced plan.

However, in the distributed data virtualization system described in PTL 1 and the query processing device described in PTL 2, dynamic change of the limit values of the resources is not expected when there is an upper limit on the physical resources such as hardware.

Further, the information search device described in PTL 3 includes a search formula division unit that reads a search formula in which a desired search condition is described and divides the search formula into a predetermined simplified format, and a search formula evaluation unit that evaluate whether a consumption amount of a resource at the time of search by the divided simplified search formula falls within a resource upper limit value. That is, in the information search device described in PTL 3, prediction of the resource consumption amount by the search formula itself in which a desired search condition is described is not expected.

According to the present invention, an upper limit value of the resource amount usable in search query execution processing can be dynamically changed.

While the invention has been particularly shown and described with reference to exemplary embodiments thereof, the invention is not limited to these embodiment. It will be understood by those of ordinary skill in the art that various changes in form and details may be made therein without departing from the spirit and scope of the present invention as defined by the claims.

The present invention can be favorably applied to a data management field, and a file management field of text files, image files, or audio files, and the like.

What is claimed is:

1. A data search method comprising:
    predicting a resource amount to be used in query processing scheduled to be executed, using a relationship between query processing executed in a past and a resource amount used in the query processing;
    changing an upper limit value of a resource amount usable in query processing to the predicted resource amount to be used in the query processing scheduled to be executed for which execution has been permitted; and
    predicting the resource amount to be used in the query processing scheduled to be executed, based on a data amount to be handled in the query processing scheduled to be executed, using a relationship between a data amount handled in the query processing executed in a past and the resource amount used in the query processing.

2. The data search method according to claim 1, further comprising:
    confirming the data amount to be handled in the query processing scheduled to be executed; and
    determining whether permitting execution of the query processing scheduled to be executed based on the confirmed data amount.

3. The data search method according to claim 2, further comprising:
    executing the query processing scheduled to be executed for which execution has been permitted; and
    recording the resource amount used in the executed query processing.

4. The data search method according to claim 2, further comprising:
    generating the query processing scheduled to be executed based on information indicating a data search condition.

5. The data search method according to claim 1, further comprising:
    determining whether permitting execution of the query processing scheduled to be executed based on the predicted resource amount to be used in the query processing scheduled to be executed.

6. The data search method according to claim 5, further comprising:
    executing the query processing scheduled to be executed for which execution has been permitted; and
    recording the resource amount used in the executed query processing.

7. The data search method according to claim 5, further comprising:
    generating the query processing scheduled to be executed based on information indicating a data search condition.

8. The data search method according to claim 1, further comprising:
    executing the query processing scheduled to be executed for which execution has been permitted; and
    recording the resource amount used in the executed query processing.

9. The data search method according to claim 8, further comprising:
    generating the query processing scheduled to be executed based on information indicating a data search condition.

10. The data search method according to claim 1, further comprising:
    generating the query processing scheduled to be executed based on information indicating a data search condition.

11. A data search device comprising:
    a memory configured to store one or more instructions; and
    at least one processor configured to execute the one or more instruction to:

predict a resource amount to be used in query processing scheduled to be executed, using a relationship between query processing executed in a past and a resource amount used in the query processing; and change an upper limit value of a resource amount usable in query processing to the predicted resource amount to be used in the query processing scheduled to be executed for which execution has been permitted, wherein the at least one processor is further configured to predict the resource amount to be used in the query processing scheduled to be executed, based on a data amount to be handled in the query processing scheduled to be executed, using a relationship between a data amount handled in the query processing executed in a past and the resource amount used in the query processing.

12. A non-transitory computer-readable recording medium recording a data search program for causing a computer to execute:

a prediction process of predicting a resource amount to be used in query processing scheduled to be executed, using a relationship between query processing executed in a past and a resource amount used in the query processing; and a change process of changing an upper limit value of a resource amount usable in query processing to the predicted resource amount to be used in the query processing scheduled to be executed for which execution has been permitted, wherein, in the prediction process, the resource amount to be used in the query processing scheduled to be executed, based on a data amount to be handled in the query processing scheduled to be executed, using a relationship between a data amount handled in the query processing executed in a past and the resource amount used in the query processing.

* * * * *